(12) United States Patent
Grove

(10) Patent No.: US 8,353,560 B2
(45) Date of Patent: Jan. 15, 2013

(54) NO-TOOLS CHAIR ASSEMBLY

(76) Inventor: James E. Grove, Marina Del Rey, CA (US)

( * ) Notice: Subject to any disclaimer, the term of this patent is extended or adjusted under 35 U.S.C. 154(b) by 4 days.

(21) Appl. No.: 12/660,833

(22) Filed: Mar. 5, 2010

(65) Prior Publication Data
US 2011/0215629 A1 Sep. 8, 2011

(51) Int. Cl.
A47C 7/02 (2006.01)
(52) U.S. Cl. ........... 297/440.16; 297/440.2; 297/440.21; 297/411.44
(58) Field of Classification Search ............. 297/440.16, 297/440.2, 440.21, 411.44
See application file for complete search history.

(56) References Cited

U.S. PATENT DOCUMENTS

| 4,073,539 | A  | * | 2/1978  | Caruso ................. 297/411.44 X |
| 4,123,105 | A  | * | 10/1978 | Frey et al. ................... 297/451.1 |
| 5,498,065 | A  | * | 3/1996  | Tosoni ..................... 297/440.21 |
| 5,924,769 | A  | * | 7/1999  | Kao .......................... 297/411.44 |
| 6,422,654 | B1 | * | 7/2002  | Grove ...................... 297/440.16 |
| 6,517,159 | B1 | * | 2/2003  | Wu ............................ 297/411.44 |
| 7,147,286 | B2 | * | 12/2006 | Cesaroni et al. ...... 297/411.44 X |
| 7,429,084 | B2 | * | 9/2008  | Diedrich .................. 297/440.16 |
| 7,604,298 | B2 | * | 10/2009 | Peterson et al. ........... 297/440.2 |
| 7,775,600 | B2 | * | 8/2010  | Battey et al. ............. 297/440.21 |
| 2006/0049681 | A1 | * | 3/2006 | Diedrich .................. 297/440.21 |
| 2008/0036266 | A1 | * | 2/2008 | Battey et al. ............. 297/440.21 |

* cited by examiner

Primary Examiner — Rodney B White
(74) Attorney, Agent, or Firm — Morland C. Fischer

(57) ABSTRACT

A chair assembly including a seat, a back and at least one arm that are detachably connected together without requiring the use of tools or special skill. The chair assembly can be advantageously shipped disassembled in a compact, space-efficient package to reduce shipping costs. A seat bracket affixed to the arm is slidably and removably received by a seat bracket receiver affixed to the seat, whereby the arm is detachably connected to the seat. A back bracket affixed to the back is slidably and removably received by a back bracket receiver at the arm, whereby the back is detachably connected to the arm. The back bracket includes a locking catch that is adapted to rotate into and out of locking engagement with one of a set of serrated edges from a locking plate of the back bracket receiver after the back bracket slides into removable receipt by the back bracket receiver.

20 Claims, 8 Drawing Sheets

NO-TOOLS CHAIR ASSEMBLY

BACKGROUND OF THE INVENTION

1. Field of the Invention

This invention relates to a chair assembly including a seat, a back and a pair of arms that can all be detachably connected together without requiring the use of tools, hardware or special skill. The chair assembly can be advantageously shipped disassembled in a compact, space-efficient package so as to reduce shipping costs.

2. Background Art

Articles of furniture have long been shipped in a fully-assembled condition from a manufacturer to a retailer and then carried off by an end user to a home or office. Consequently, such an article of furniture is characteristically bulky, cumbersome and difficult to transport in a space-efficient manner. That is to say, a fully-assembled article of furniture consumes relatively large shipping space during transport by boat, truck, etc. to a retailer. Similarly, the purchaser/end user may need to have available a specially-sized vehicle should he wish to carry a large article of furniture to his home or office. The inefficient shipment of large articles of furniture between the manufacturer and end user often results in inconvenience as well as significantly higher transportation costs which are commonly passed through to the purchaser.

To overcome the aforementioned disadvantages, it is known to ship articles of furniture disassembled. In this case, the end user is typically required to have available and be able to use at least some hand tools and hardware provided by the manufacturer in order to complete the furniture assembly. Sometimes, the user may not have the skill required to use the tools and manipulate the hardware which may consequently hinder the user's ability to easily assemble and immediately enjoy his furniture. In other cases, the user may lack time and become frustrated which can result in his failure to complete the assembly altogether. Thus, the article of furniture may remain disassembled and eventually have to be returned to its point of purchase.

Accordingly, it would be desirable to have a particular article of furniture (e.g., a home or office chair) that is adapted to be shipped and transported disassembled within a compact shipping container so as to minimize shipping costs and then be relatively quickly and easily assembled without requiring special skill or the use of tools or hardware.

SUMMARY OF THE INVENTION

In general terms, the seat, back and a pair of arms of a home or office chair assembly are described which can be detachably connected together without requiring the use of tools, hardware or special skill. The chair assembly can be shipped and transported disassembled in a compact, space-efficient package to reduce shipping costs.

An arm bracket projects outwardly from each arm of the pair of arms of the chair assembly. A back bracket receiver is recessed in each arm above the arm bracket. A pair of back bracket guide rail slots runs along opposite sides of the back bracket receiver. A cavity is formed in the top of the back bracket receiver within which to receive a back bracket locking plate to be connected to the chair arm. The back bracket locking plate has a set of horizontally-extending and parallel-aligned serrated edges that are accessible within the back plate receiver.

Affixed to the back of the chair is a pair of flexible back brackets to be removably attached to respective back bracket receivers of the pair of chair arms by which the chair back is detachably connected to the arms so as to extend therebetween. A rotatable lock release head is located at one end of each flexible back bracket. A locking catch which projects from the back bracket is rotatable with the lock release head. A pair of parallel guide rails runs along opposite sides of the back bracket.

A pair of seat bracket receivers are affixed to the bottom of the chair seat. Each seat bracket receiver has curved opposite ends to create a coupling channel for the removable receipt of a corresponding seat bracket that projects from one of the pair of chair arms.

The no-tools chair of this invention is quickly and easily assembled by first detachably connecting the pair of arms to opposite sides of the seat. To accomplish the foregoing, the arms are moved towards the seat such that the seat brackets carried by and projecting from the arms are slidably received within and captured by respective ones of the coupling channels of the seat bracket receivers affixed to the bottom of the seat. Next, the chair back is detachably connected to the pair of arms so as to extend therebetween and stand upwardly from the seat. To accomplish the foregoing, the back is held above and moved downwardly towards the seat so that the flexible back brackets carried at the rear of the back are slidably received within respective ones of the back bracket receivers recessed in the chair arms. That is, the guide rails of each back bracket slide longitudinally through and are captured by the back bracket guide rail slots which run alongside each back bracket receiver. The locking catch of each back bracket simultaneously rides over and into locking engagement with one of the set of serrated edges of the back bracket locking plate that is received within the cavity at the top of the back bracket receiver. Should it become necessary to remove or adjust the chair back relative to the chair arms, a force is applied to the lock release head of each flexible back bracket to cause the lock release head to rotate and thereby pull the locking catch of the back bracket out of its engagement with the serrated edges of the back bracket locking plate.

DESCRIPTION OF THE PREFERRED EMBODIMENT

Figure 1:
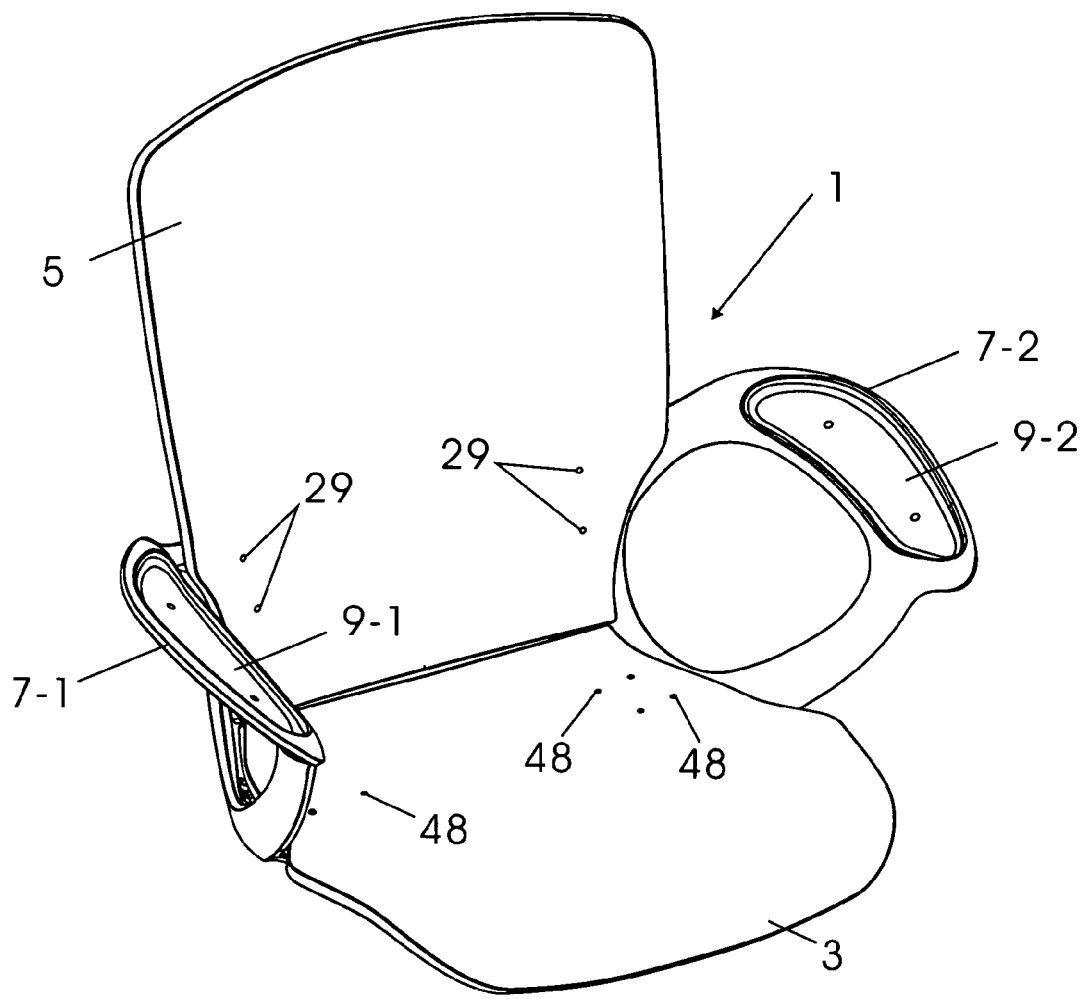
FIG. 1 shows parts of a no-tools chair according to a preferred embodiment including a seat, a back, and a pair of arms that are shipped disassembled and detachably connected to one another.

FIG. 1 of the drawings shows parts of a chair 1 that can be shipped to and transported by a user disassembled in a compact shipping container to be removed from the container and assembled without the requirement of tools, hardware or special skill. The chair 1 includes a (e.g., plywood) seat 3, a (e.g., plywood) back 5, and a pair of (e.g., molded plastic) arms 7-1 and 7-2. The seat 3, back 5 and arms 7-1 and 7-2 of chair 1 are packaged and shipped disconnected. However, as will be explained in greater detail hereinafter, the pair of arms 7-1 and 7-2 are manufactured (e.g., molded) so that the arms, the seat 3 and back 5 can be quickly and easily connected to one another during assembly of the no-tools chair 1.

The arms 7-1 and 7-2 of the chair 1 of FIG. 1 include pockets 9-1 and 9-2 within which cushion arm rests (not shown) are to be attached. Other parts of the chair (also not shown) will be connected to the seat 3 to complete the chair assembly. However, such other chair parts form no part of the present invention.

Figure 2:
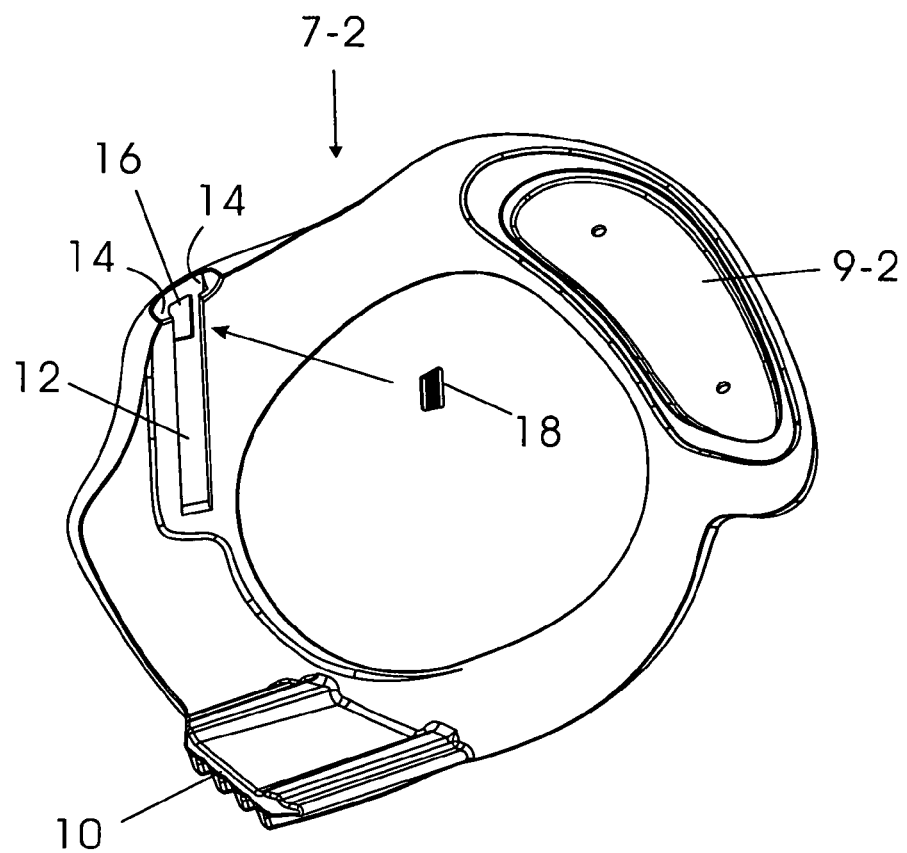
FIG. 2 shows one arm of the pair of arms of the no-tools chair of FIG. 1.

FIG. 2 of the drawings shows the seat facing side of one (e.g., 7-2) of the pair of arms from the chair 1 of FIG. 1 with means by which to facilitate the interconnection of arm 7-2 to the seat 3 and back 5 during assembly. The chair arm 7-2 has a ribbed (e.g., molded plastic) seat bracket 10 projecting outwardly therefrom to be moved into receipt by and engagement with a seat bracket receiver (designated 44-2 in FIG. 8) in order to connect the arm 7-2 to the chair seat 3. The chair arm 7-2 also has a back bracket receiver 12 recessed therein and located above the seat bracket 10. The back bracket receiver 12 establishes a recess within which to receive a back bracket (designated 26 in FIGS. 5 and 6) in order to connect the chair back 5 to the arm 7-2. To this end, the back bracket receiver 12 of arm 7-2 has a pair of longitudinal back bracket guide rail slots 14 running along opposite sides thereof at which to slidably engage and retain the back bracket 26.

Figure 3:
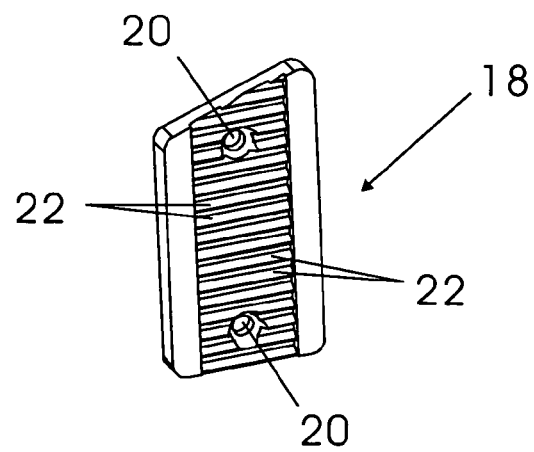
FIG. 3 shows a back bracket locking plate which is affixed to the chair arm of FIG. 2 to enable the back of the no-tools chair to be detachably connected to the chair arm.

Located at the top of the back bracket receiver 12 of the chair arm 7-2 is a cavity 16 within which to receive a back bracket locking plate 18 (best shown in FIG. 3). Referring in this regard to FIGS. 2 and 3, the back bracket locking plate 18 includes mounting holes 20 through which fasteners (not shown) are inserted during manufacture of the arm 7-2 to connect locking plate 18 within the cavity 16 of the back bracket receiver 12. The back bracket locking plate 18 also includes a set of horizontally-extending and parallel-aligned serrated edges 22 formed at an outside face thereof. The locking plate 18 lying inside the cavity 16 lies flush with the back plate receiver 12 such that the serrated edges 22 of locking plate 18 are accessible at the back plate receiver 12 of chair arm 7-2 for an advantage that will soon be described.

Figure 4:
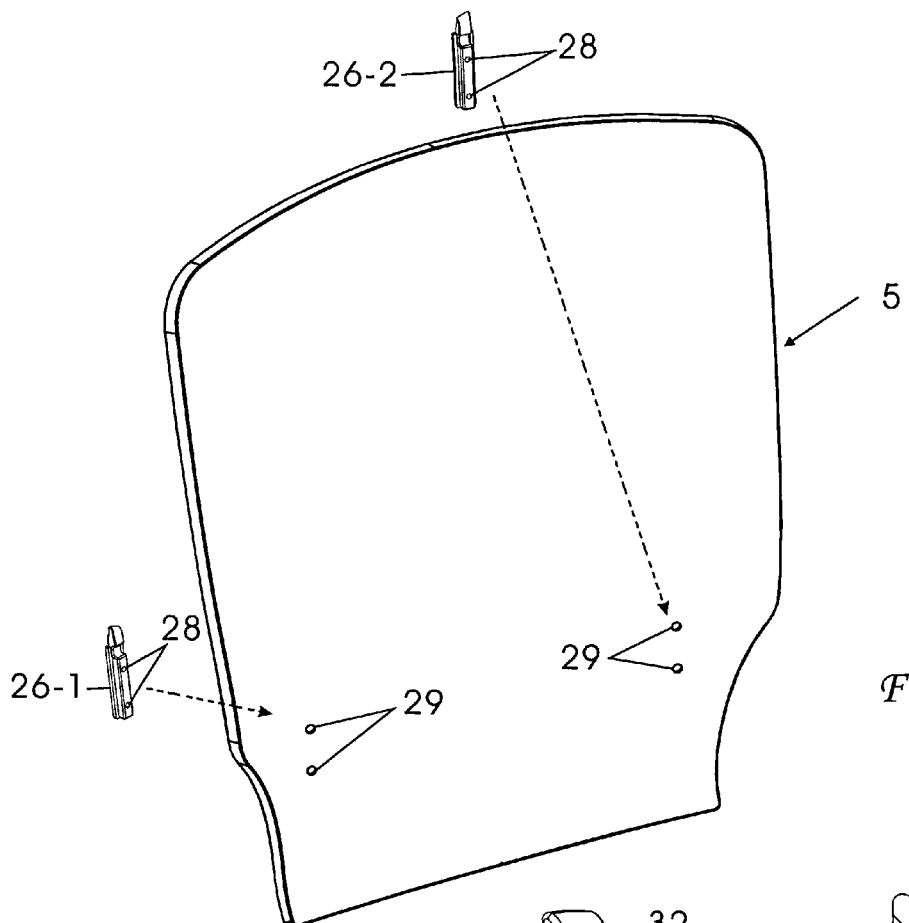
FIG. 4 shows the back of the no-tools chair and a pair of back brackets to be affixed thereto.

FIG. 4 of the drawings shows a pair of identical back brackets 26 to be affixed to the rear of the chair back 5 at opposite sides thereof so that the back 3 can be detachably connected to the chair arms (one of which 7-2 being shown in FIG. 2). Each back bracket 26-1 and 26-2 has mounting holes 28 through which fasteners (not shown) are inserted during manufacture of the chair back 5 in order to connect the back brackets to the rear of the chair back 3 at holes 29 formed therein so that each back bracket will be aligned for receipt by a back bracket receiver (designated 12 in FIG. 2) of a corresponding one of the pair of chair arms.

Figures 5, 6:
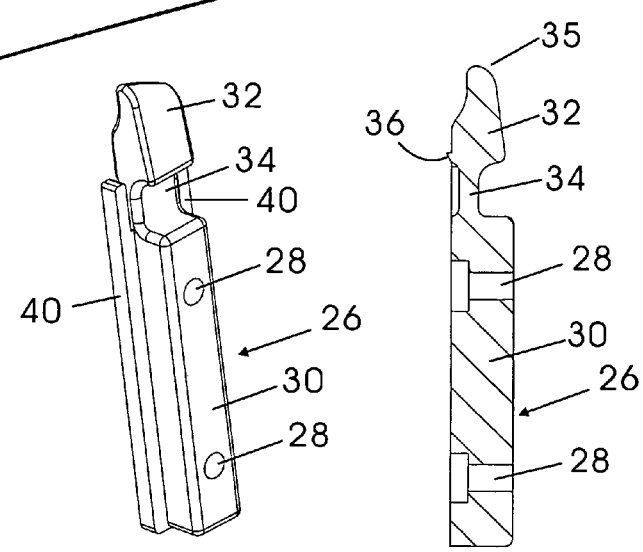
FIG. 5 is an enlarged perspective view of one of the back brackets of FIG. 4.
FIG. 6 is a cross-section of the back bracket of FIG. 5.

Details of each back bracket 26 are described while referring to FIGS. 5 and 6 of the drawings. Back bracket 26 is preferably manufactured from a flexible material, such as, for example, spring steel or nylon. Back bracket 26 has a body 30 located at one end thereof through which the mounting holes 28 extend and a rotatable lock release head 32 at the opposite end. A relatively narrow neck 34 extends between the body 30 and the head 32 to enable the head 32 to rotate relative to the body 30 (in the direction of the reference arrow 35 of FIG. 5) in response to a force manually applied thereto.

A locking catch 36 (best shown in FIG. 6) projects outwardly from the rear of the back bracket 26. A will soon be described, the locking catch 36 is moved into detachable locking engagement with one of the serrated edges 22 of the back bracket mounting plate 18 (of FIG. 3) when the chair back 5 is connected to the chair arms 7-1 and 7-2 in the manner to be described when referring to FIGS. 10-12. A pair of parallel guide rails 40 (best shown in FIG. 5) runs longitudinally along the neck and body 34 and 30 of the back bracket 26. The guide rails 40 are slidable through respective ones of the back bracket guide rail slots 14 of the back bracket receiver 12 (of FIG. 2) when the chair back 5 is attached to the arm 7-2 (of FIG. 2) and the back bracket 26 carried by the chair back 5 is correspondingly moved through the back bracket receiver 12.

Figure 7:
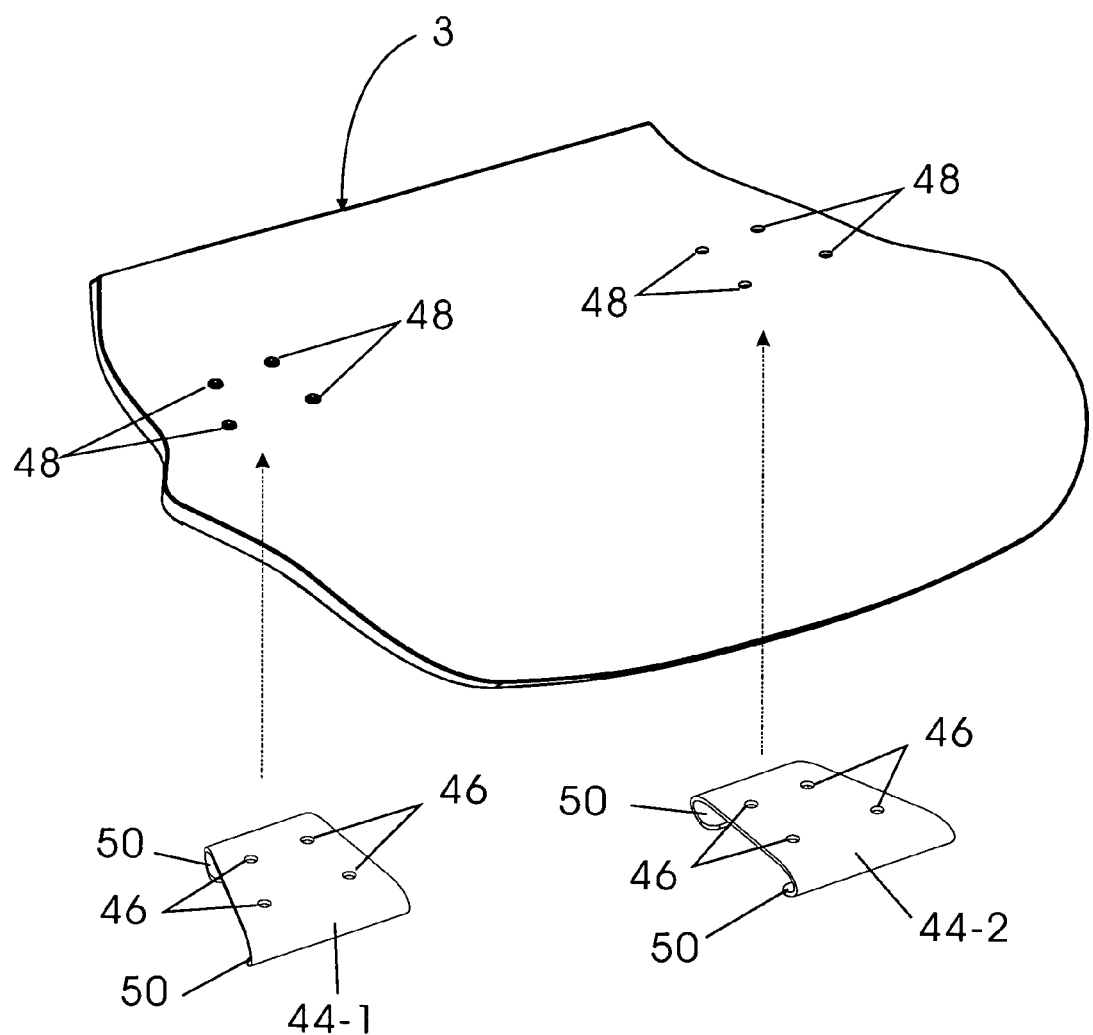
FIG. 7 shows the seat of the no-tools chair and a pair of seat bracket receivers to be affixed thereto.

FIG. 7 of the drawings shows a pair of seat bracket receivers 44-1 and 44-2 to be affixed to the bottom of the chair seat 3. Each of the seat bracket receivers 44-1 and 44-2 has mounting holes 46 to be aligned with holes 48 formed in the seat 3 through which fasteners (not shown) are inserted during manufacture of the seat by which to connect the seat bracket receivers underneath the seat. The opposite ends of each seat bracket receiver 44-1 and 44-2 are bent backwards towards one another to create opposing coupling channels 50 that are sized to slidably receive therewithin one of the seat brackets 10 that is carried by one of the chair arms (7-2 of FIG. 2) when the chair arm is attached to the chair seat 3 in the manner to be described when referring to FIGS. 8 and 9.

Figure 8:
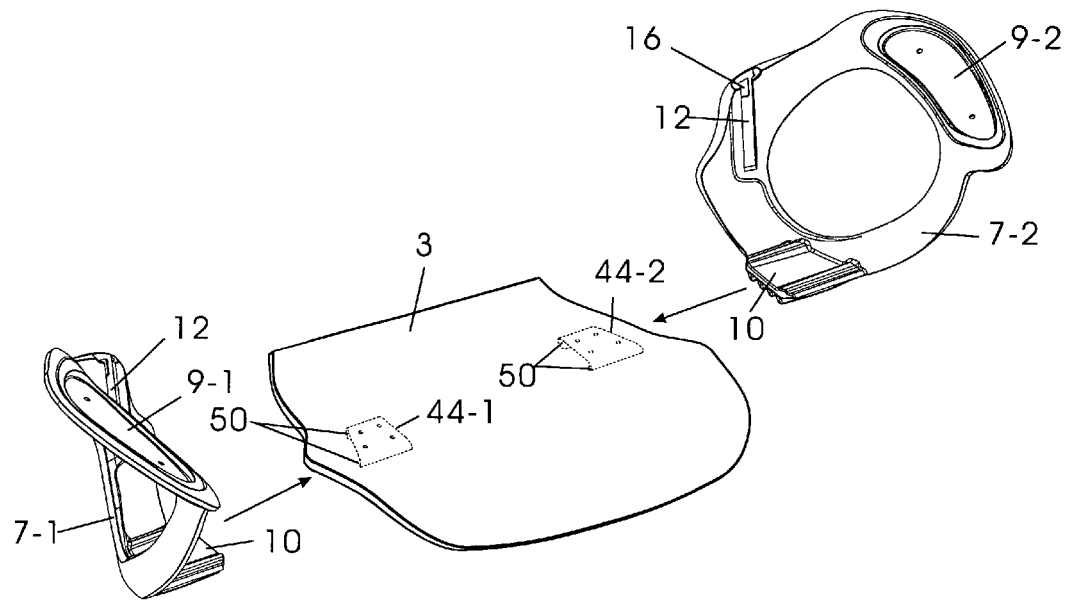
FIG. 8 shows the pair of arms being detachably connected to the seat during assembly of the no-tools chair.
Figure 9:
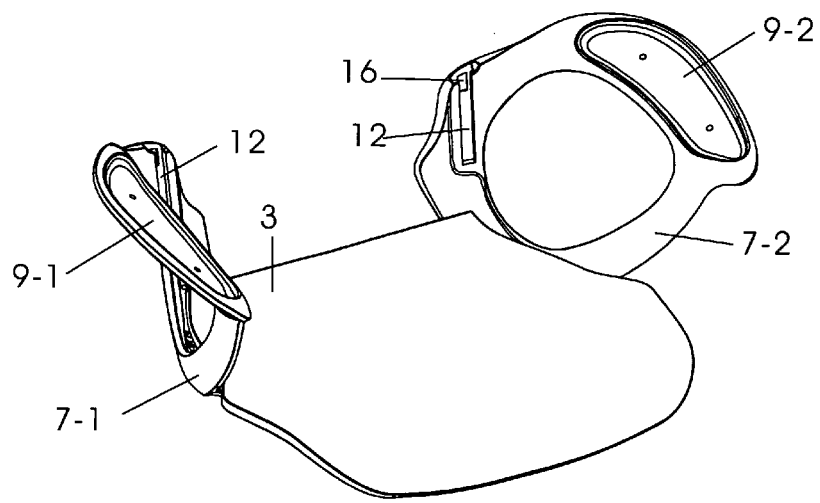
FIG. 9 shows the pair of arms and the seat of the no-tools chair once they have been connected to one another.

The method by which the chair 1 of FIG. 1 is quickly and easily assembled without the use of hardware, tools or special skill is now described. Turning first to FIGS. 8 and 9 of the drawings, the pair of arms 7-1 and 7-2 are shown being attached to opposite sides of the seat 3. More particularly, the arms 7-1 and 7-2 are moved laterally towards the seat 3 such that the coupling channels 50 of the seat bracket receivers 44-1 and 44-2 lying underneath the seat 3 slidably receive and capture respective ones of the ribbed seat brackets 10 which project from the arms 7-1 and 7-2. The receipt of the seat brackets 10 by the coupling channels 50 of the seat bracket receivers 44-1 and 44-2 below the seat 3 prevents the arms 7-1 and 7-2 from twisting or turning relative to the seat.

Figure 10:
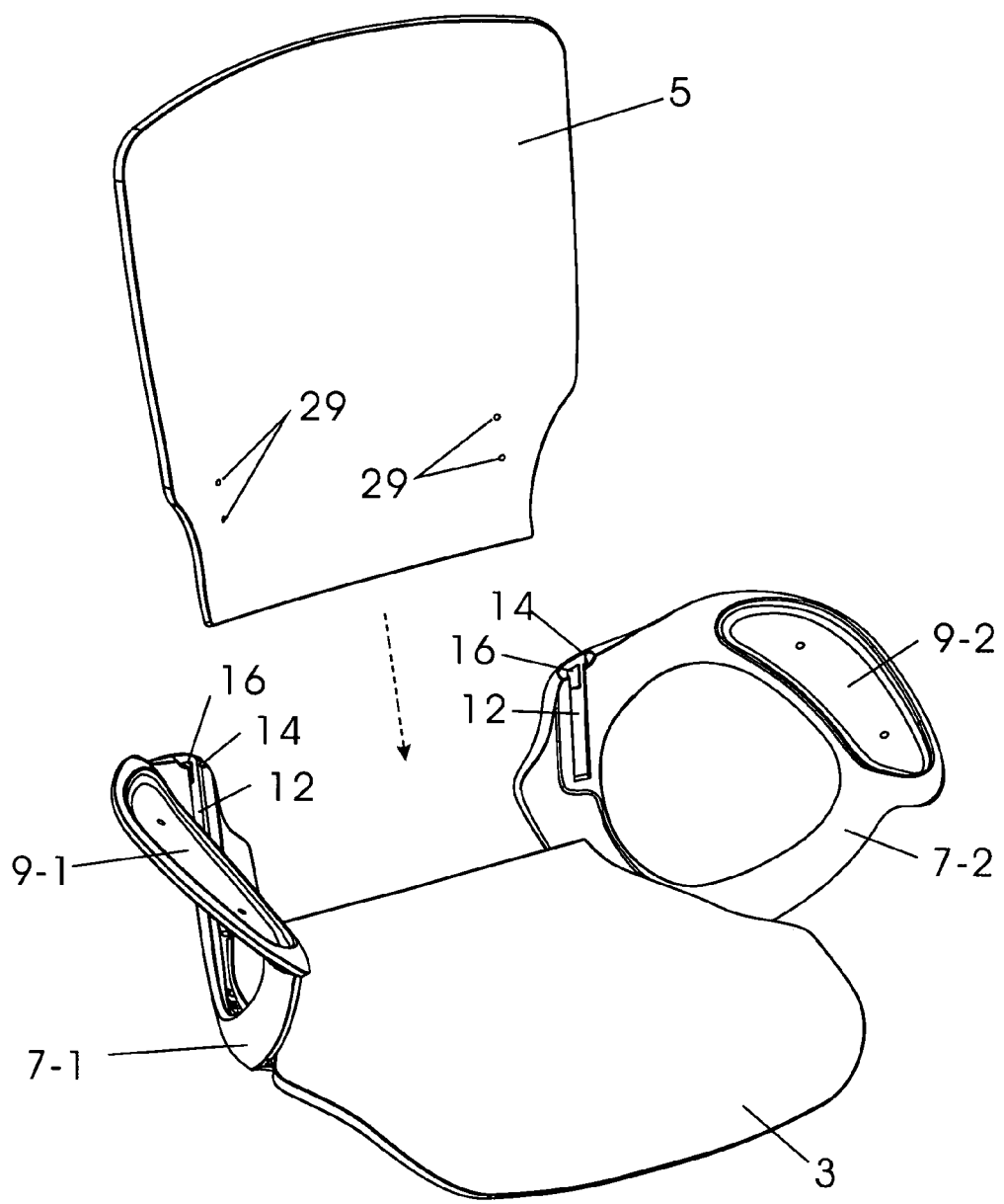
FIGS. 10 and 11 show the back being detachably connected to the pair of arms of the no-tools chair.
Figure 11:
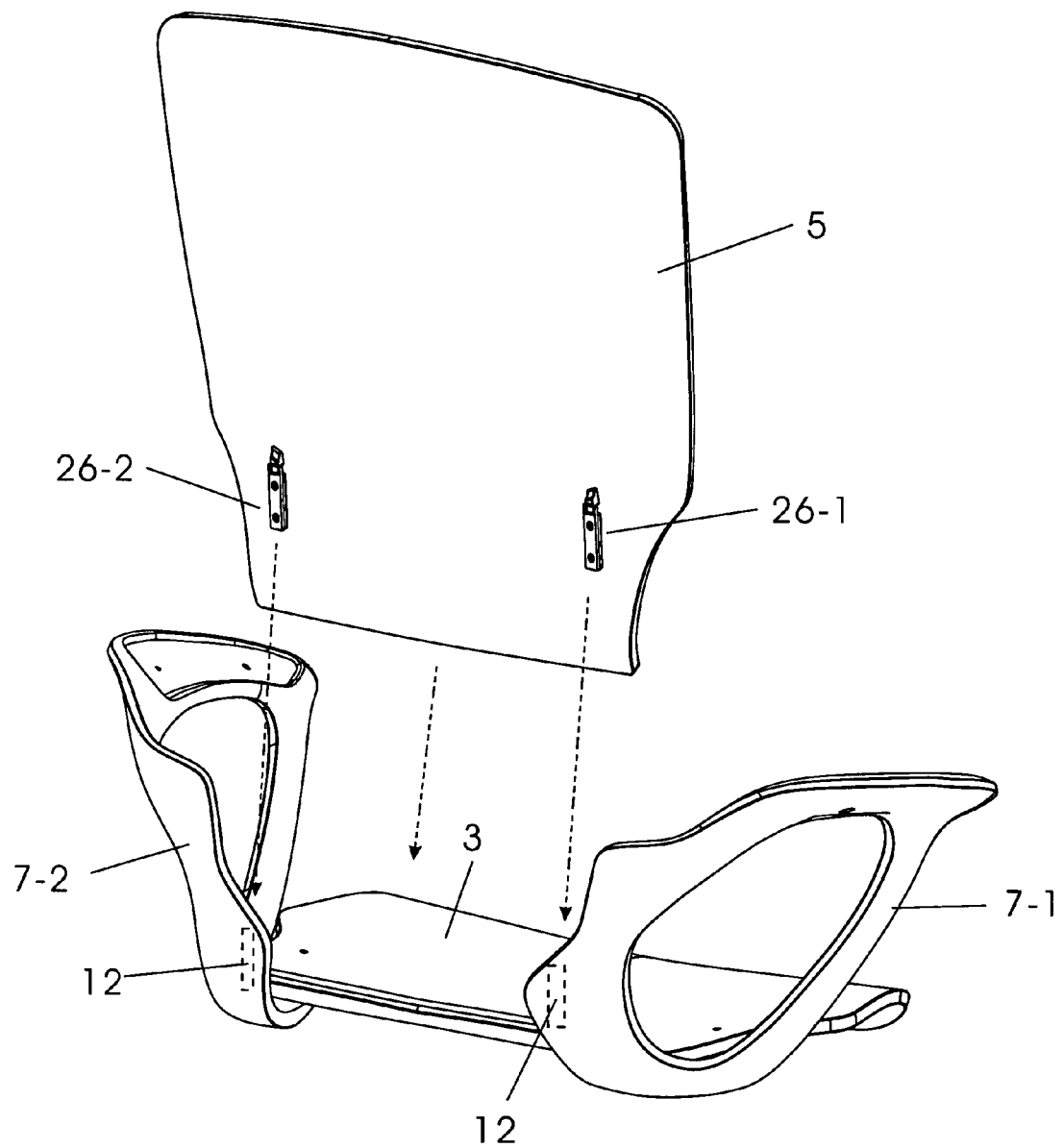
Figure 12:
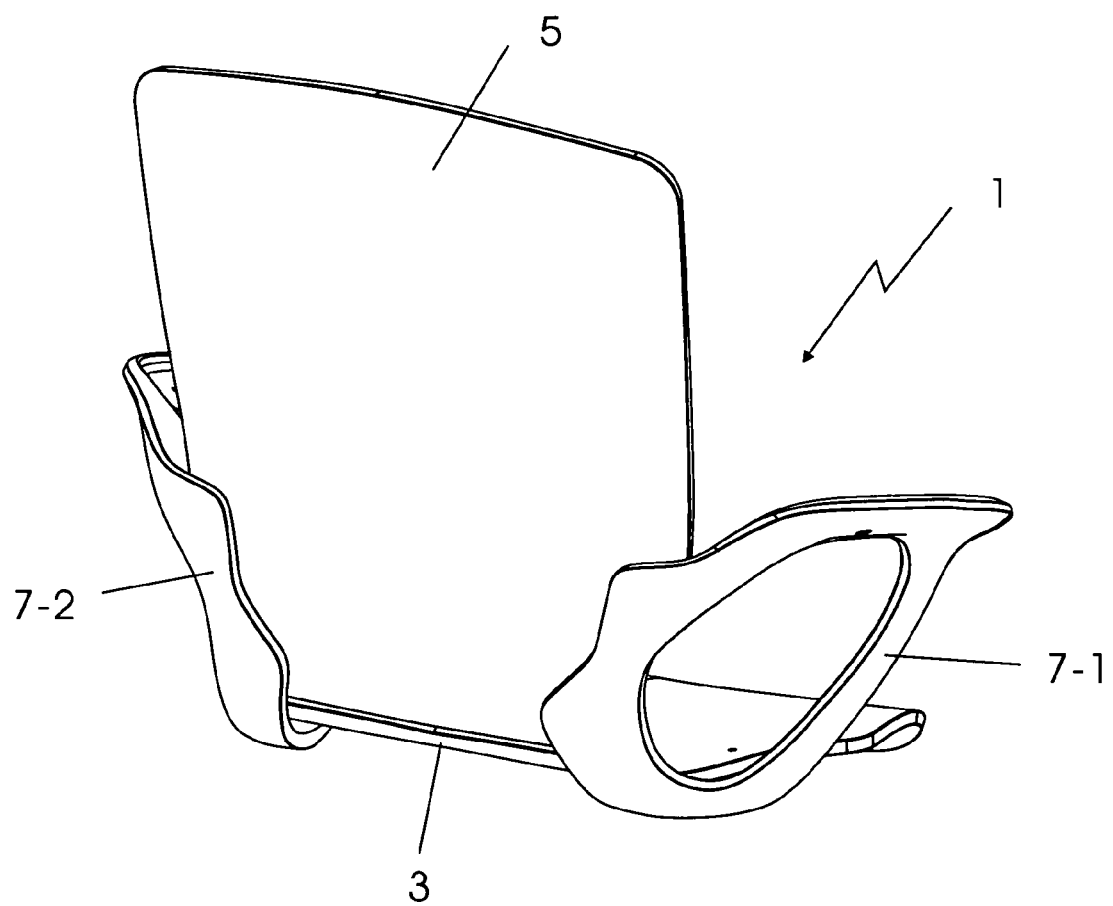
FIG. 12 shows the back and the pair of arms of the no-tools chair once they have been connected to one another.

Referring now to FIGS. 10-12 of the drawings, the chair back 5 is shown being attached to the pair of arms 7-1 and 7-2 which has first been connected to the seat 3. More particularly, the back 5 is held above and moved downwardly towards the seat 3 such that the back brackets 26-1 and 26-2 mounted at the rear of seat 5 (best shown in FIG. 11) are slidably received through respective back bracket receivers 12 formed in chair arms 7-1 and 7-2. That is, and referring once again to FIGS. 2-6, the body 30 of each back bracket 26 is pushed downwardly through a back bracket receiver 12 so that the guide rails 40 of the back bracket slide longitudinally through and are captured by the back bracket guide rail slots 14 (of FIG. 2) which run alongside the receiver 12. At the same time, the locking catch 36 (of FIG. 6) of each back bracket 26 rides over and into locking engagement with one of the serrated edges 22 of the back bracket locking plate 18 (of FIG. 3) that is located within the cavity 16 atop the back bracket receiver 12.

With the pair of guide rails 40 of the back brackets 26-1 and 26-2 received by the guide rail slots 14 of the back bracket receivers 12 and the locking catches 36 of back brackets 26-1 and 26-2 engaging a serrated edge 22 of the back bracket locking plates 18, the back 5 will be detachably connected to and held in place between the arms 7-1 and 7-2 so as to stand upwardly from the seat 3 (best shown in FIG. 12) of the no-tools chair 1. It may be appreciated that with the guide rails 40 received by the guide rail slots 14 and each of the locking catches 36 engaging a serrated edge 22, the seat 3, back 5 and arm 7 of the chair 1 are all interconnected to one another so as to avoid an inadvertent separation thereof. In this same regard, locking the back 5 in place between the pair of arms 7-1 and 7-2 prevents the arms from being pulled outwardly and away from the seat 3.

Should it be necessary to adjust the position or remove the back 5 from the arms 7-1 and 7-2 of chair 1, a pushing force is applied by the user to the lock release head 32 of each back bracket 26-1 and 26-2 (in the direction of the reference arrow 35 of FIG. 6). Because of the flexible nature of the back brackets 26-1 and 26-2, the lock release heads 32 thereof will rotate at the necks 34 away from the back bracket receivers 12 and towards the chair back 5 so that the locking catches 36 of the back brackets are correspondingly moved out of their engagement with the serrated edges 22 of the back bracket locking plates 18 (of FIG. 3). The chair back 5 is now free to be pulled upwardly and away from the chair arms 7-1 and 7-2 so that the back brackets 26-1 and 26-2 carried by the back 5 slide outwardly and are detached from the back bracket receivers 12 that are recessed in the chair arms. When the chair back 5 is separated from the chair arms 7-1 and 7-2 as just explained, should it become necessary, the arms may be detached from the seat 3 by the user pulling the arms outwardly and away from the seat in order to cause the seat brackets 10 to slide out of their receipt by the seat bracket receivers 44-1 and 44-2.

The invention claimed is:

1. A chair assembly comprising a seat, a back, at least one arm, an arm connector carried by said one arm, an arm connector receiver carried by said seat, a back connector carried by said back, and a back connector receiver carried by said one arm and including a recess that is formed in said one arm in which to receive said back connector, said arm connector being mated to said arm connector receiver without the use of tools and said back connector being mated to said back connector receiver without the use of tools such that said one arm is attached to said seat and said back is attached to said one arm without the use of tools, said back connector having a guide rail and said back connector receiver having a guide rail slot that runs alongside the recess of said back connector receiver formed in said one arm, said guide rail being slidably received within and captured by said guide rail slot when said back is attached to said one arm.

2. The chair assembly recited in claim 1, wherein said back connector also has a locking catch movable into locking engagement with said back connector receiver carried by said one arm.

3. The chair assembly recited in claim 2, wherein said back connector receiver also has a locking edge located within the recess thereof, the locking catch of said back connector moving into said locking engagement with said back connector receiver at said locking edge.

4. The chair assembly recited in claim 3, wherein said back connector receiver also has a locking plate attached to said one arm within the recess of said back connector receiver, said locking edge being formed in said locking plate, and the locking catch of said back connector moving into said locking engagement with said back connector receiver at the locking edge formed in said locking plate.

5. The chair assembly recited in claim 4, wherein there is a cavity formed within the recess of said back connector receiver, said locking plate lying within said cavity such that the locking edge formed in said locking plate is disposed within said recess.

6. The chair assembly recited in claim 3, wherein said back connector also has a rotatable lock release head to which said locking catch is attached, said lock release head rotating in response to a force applied thereto by which to cause said locking catch to move out of said locking engagement with the locking edge of said back connector receiver.

7. The chair assembly recited in claim 6, wherein said back connector is flexible such that the lock release head of said back connector to which said locking catch is attached is adapted to bend and rotate in response to the force applied thereto.

8. The chair assembly recited in claim 1, wherein said arm connector is detachable from said arm connector receiver without the use of tools and said back connector is detachable from said back connector receiver without the use of tools such that said one arm is detachable from said seat and said back is detachable from said one arm without the use of tools, the guide rail of said back connector sliding out of and being removed from the guide rail slot of said back connector receiver when said back is detached from said one arm.

9. The chair assembly recited in claim 1, wherein said arm connector receiver is located at one side of said seat and said arm connector carried by said one arm is slidably received by and mated to said arm connector receiver.

10. The chair assembly recited in claim 9, wherein said arm connector carried by said one arm has a bracket that projects from said arm and said arm connector receiver carried by said seat has a coupling channel, the bracket of said arm connector being slidable into receipt by and engagement with the coupling channel of said arm connector receiver, whereby said arm connector is mated to said arm connector receiver.

11. The chair assembly recited in claim 1, further comprising a lock to prevent the detachment of said back from said one arm and said one arm from said seat.

12. A chair assembly including a seat, a back and at least one arm, said chair assembly comprising:
   a first connector having a sliding bracket located at said one arm;
   a second connector having a coupling channel located at said seat;
   a third connector having a sliding rail located at said back; and
   a fourth connector having a rail receiving slot located at said one arm, the sliding bracket of said first connector sliding into mating engagement with the coupling channel of said second connector without the use of tools such that said one arm is attached to said seat, and the sliding rail of said third connector sliding into mating engagement with the rail receiving slot of said fourth connector without the use of tools such that said back is attached to said one arm.

13. The chair assembly recited in claim 12, wherein the sliding bracket of said first connector is detachable from the coupling channel of said second connector without the use of tools, and the sliding rail of said third connector is detachable from the rail receiving slot of said fourth connector without the use of tools.

14. The chair assembly recited in claim 12, wherein said fourth connector also has a locking surface and said third connector also has a locking catch movable into locking engagement with said locking surface when the sliding rail of said third connector slides into said mating engagement with the rail receiving slot of said fourth connector.

15. The chair assembly recited in claim 14, wherein the locking surface of said fourth connector includes a locking edge, the locking catch of said third connector moving into said locking engagement with said locking surface at said locking edge thereof.

16. The chair assembly recited in claim 15, wherein the locking surface of said fourth connector also includes a locking plate attached to said one arm, the locking edge of said locking surface being formed in said locking plate.

17. The chair assembly recited in claim 16, wherein there is a cavity formed in said fourth connector, the locking plate of said locking surface in which said locking edge is formed lying within said cavity.

18. The chair assembly recited in claim 16, wherein said third connector also has a rotatable lock release head to which said locking catch is attached, said lock release head rotating in response to a force applied thereto by which to cause said locking catch to move out of said locking engagement with the locking edge of the locking surface of said fourth connector.

19. A chair assembly comprising a seat, a back, at least one arm, an arm connector carried by said one arm and having a bracket projecting therefrom, an arm connector receiver carried by said seat and having a coupling channel, a back connector carried by said back, and a back connector receiver carried by said one arm, the bracket projecting from said arm connector being slidably received by and mated to the coupling channel of said arm connector receiver at said seat, whereby said arm connector is mated to said arm connector receiver without the use of tools and said back connector is mated to said back connector receiver without the use of tools such that said one arm is attached to said seat and said back is attached to said one arm without the use of tools, said back connector having a guide rail and said back connector receiver having a guide rail slot, said guide rail being slidably received within and captured by said guide rail slot when said back is attached to said one arm.

20. The chair assembly recited in claim 19, wherein said back connector carried by said back has a locking catch and said back connector receiver carried by said one arm has a set of locking edges, said locking catch moving into locking engagement with said back connector receiver between a pair of adjacent locking edges from of the set of locking edges of said back connector receiver.

* * * * *